United States Patent
Kim et al.

(10) Patent No.: US 12,174,735 B2
(45) Date of Patent: Dec. 24, 2024

(54) STORAGE CONTROLLER DEALLOCATING MEMORY BLOCK, METHOD OF OPERATING THE SAME, AND METHOD OF OPERATING STORAGE DEVICE INCLUDING THE SAME

(71) Applicant: Samsung Electronics Co., Ltd., Suwon-si (KR)

(72) Inventors: Dongki Kim, Hwaseong-si (KR); Ilkueon Kang, Suwon-si (KR); Gwang-Ok Go, Suwon-si (KR); Junseok Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/049,380

(22) Filed: Oct. 25, 2022

(65) Prior Publication Data

US 2023/0236964 A1     Jul. 27, 2023

(30) Foreign Application Priority Data

Jan. 26, 2022   (KR) .................. 10-2022-0011769
May 24, 2022   (KR) .................. 10-2022-0063763

(51) Int. Cl.
*G06F 12/02*     (2006.01)
*G06F 12/0891*   (2016.01)

(52) U.S. Cl.
CPC ...... *G06F 12/0246* (2013.01); *G06F 12/0891* (2013.01)

(58) Field of Classification Search
CPC .. G06F 12/02; G06F 12/0246; G06F 12/0891; G06F 12/08; G06F 12/06; G06F 12/058
See application file for complete search history.

(56) References Cited

U.S. PATENT DOCUMENTS 9,841,906 B2 * 12/2017 Sokolov ............... G06F 3/0659
10,901,887 B2    1/2021 Jacob et al.
(Continued)

FOREIGN PATENT DOCUMENTS

EP    1713085 A1 * 10/2006 ......... G06F 12/0246
EP    3859525 A1 *  8/2021 ......... G06F 12/0646

OTHER PUBLICATIONS

S. Jung and Y. Ho Song, "Garbage Collection for Low Performance Variation in NAND Flash Storage Systems," in IEEE Transactions on Computer-Aided Design of Integrated Circuits and Systems, vol. 34, No. 1, pp. 16-28, Jan. 2015.*

(Continued)

*Primary Examiner* — Pierre Michel Bataille
(74) *Attorney, Agent, or Firm* — Harness, Dickey & Pierce, P.L.C.

(57) ABSTRACT

Disclosed is a method of operating a storage controller, the storage controller communicating with a host and a non-volatile memory device. The method includes receiving a first erase request from the host, the first erase request being for a first zone of a plurality of zones of the non-volatile memory device, loading first allocation list information of the first zone from an allocation list table based on the first erase request, deallocating memory blocks allocated to the first zone based on the first allocation list information, wherein sequential physical page numbers of the memory blocks are respectively mapped onto sequential logical page numbers, and providing the non-volatile memory device with a physical erase request for the deallocated memory blocks of the first zone.

20 Claims, 12 Drawing Sheets

(56) References Cited

U.S. PATENT DOCUMENTS

| | | | |
|---|---|---|---|
| 11,042,477 B2 | 6/2021 | Simak et al. | |
| 2011/0072199 A1* | 3/2011 | Reiter | G06F 13/24 |
| | | | 711/170 |
| 2011/0264884 A1* | 10/2011 | Kim | G11C 16/0483 |
| | | | 711/170 |
| 2013/0060989 A1* | 3/2013 | Aune | G06F 3/0659 |
| | | | 711/170 |
| 2020/0089407 A1 | 3/2020 | Baca et al. | |
| 2020/0409589 A1 | 12/2020 | Bennett et al. | |
| 2020/0409598 A1* | 12/2020 | Dewey | G06F 3/0604 |
| 2021/0064521 A1 | 3/2021 | Cho et al. | |
| 2021/0263674 A1* | 8/2021 | Shin | G11C 11/5628 |
| 2021/0303185 A1* | 9/2021 | Mishra | G06F 3/0631 |
| 2021/0303523 A1 | 9/2021 | Periyagaram et al. | |
| 2022/0121396 A1* | 4/2022 | Lee | G06F 3/0679 |
| 2022/0147365 A1* | 5/2022 | Bernat | G06F 11/1076 |
| 2022/0391092 A1* | 12/2022 | Yang | G06F 3/0652 |

OTHER PUBLICATIONS

Y. Feng, D. Feng, C. Yu, W. Tong and J. Liu, "Mapping granularity adaptive FTL based on flash page re-programming," Design, Automation & Test in Europe Conference & Exhibition (DATE), 2017, Lausanne, Switzerland, 2017, pp. 374-379.*

M. -L. Chiang, C. -L. Cheng and C. -H. Wu, "A New FTL-based Flash Memory Management Scheme with Fast Cleaning Mechanism," 2008 International Conference on Embedded Software and Systems, Chengdu, China, 2008, pp. 205-214.*

S. -H. Chen, C. -W. Tsao and Y. -H. Chang, "Beyond Address Mapping: A User-Oriented Multiregional Space Management Design for 3-D Nand Flash Memory," in IEEE Transactions on Computer-Aided Design of Integrated Circuits and Systems, vol. 39, No. 6, pp. 1286-1299, Jun. 2020.*

* cited by examiner

STORAGE CONTROLLER DEALLOCATING MEMORY BLOCK, METHOD OF OPERATING THE SAME, AND METHOD OF OPERATING STORAGE DEVICE INCLUDING THE SAME

CROSS-REFERENCE TO RELATED APPLICATIONS

This application claims priority under 35 U.S.C. § 119 to Korean Patent Application No. 10-2022-0011769 filed on Jan. 26, 2022, in the Korean Intellectual Property Office, and Korean Patent Application No. 10-2022-0063763 filed on May 24, 2022, in the Korean Intellectual Property Office, each of which are incorporated by reference herein in their entireties.

BACKGROUND

Some example embodiments of the present disclosure described herein relate to a storage controller, and more particularly, relate to a storage controller deallocating a memory block, a method of operating the storage controller, and a method of operating a storage device including the storage controller.

A memory device stores data in response to a write request and outputs data stored therein in response to a read request. A memory device classified as a volatile memory device loses data stored therein when a power supply is interrupted, such as a dynamic random access memory (DRAM) device, a static RAM (SRAM) device. A memory device classified as a non-volatile memory device retains data stored therein even when a power supply is interrupted, such as a flash memory device, a phase-change RAM (PRAM), a magnetic RAM (MRAM), or a resistive RAM (RRAM).

In general, the non-volatile memory device may store data depending on a random access. The random access accompanies a frequent garbage collection operation for the entire region. The frequent garbage collection operation causes a decrease in the lifetime of a storage device. An available storage capacity of the storage device may be decreased when a large over provisioning (OP) region is allocated for frequent garbage collection, wear leveling, and bad block management.

SUMMARY

Some example embodiments of the present disclosure provide a storage controller deallocating a memory block, a method of operating the storage controller, and a method of operating a storage device including the storage controller.

According to an example embodiment, a method of operating a storage controller, the storage controller communicating with a host and a non-volatile memory device, includes receiving a first erase request from the host, the first erase request being for a first zone of a plurality of zones of a memory device, loading first allocation list information of the first zone from an allocation list table based on the first erase request, deallocating memory blocks allocated to the first zone based on the first allocation list information, wherein sequential physical page numbers of the memory blocks are respectively mapped onto sequential logical page numbers, and providing the non-volatile memory device with a physical erase request for the deallocated memory blocks of the first zone.

According to an example embodiment, a method of operating a storage device, the storage device communicating with a host includes receiving an erase request from the host, the erase request being for a target zone of a plurality of zones of a non-volatile memory device, loading allocation list information of the target zone from an allocation list table based on the erase request, deallocating memory blocks allocated to the target zone based on the allocation list information, wherein sequential physical page numbers of the memory blocks are respectively mapped onto sequential logical page numbers, physically erasing the deallocated memory blocks of the target zone, and after the deallocated memory blocks are physically erased, providing the host with a response indicating that the erase request is processed.

According to an example embodiment, a storage controller includes processing circuitry configured to implement a zoned namespace (ZNS) manager that communicates with a host and a non-volatile memory device, a mapping table that manages a mapping relationship between a logical address and a physical address, an allocation list table that manages allocation list information of a target zone of a plurality of zones, and a valid page count (VPC) table that manages VPC values of a plurality of memory blocks allocated to the target zone. The ZNS manager is configured to receive an erase request for the target zone of the host, load the allocation list information of the target zone from the allocation list table, based the erase request, remove a mapping relationship of the plurality of memory blocks allocated to the target zone from the mapping table based on the allocation list information of the target zone, and provides the non-volatile memory device with a physical erase request for the plurality of memory blocks whose mapping relationship is removed. Sequential physical page numbers of the plurality of memory blocks of the target zone are respectively mapped onto sequential logical page numbers.

BRIEF DESCRIPTION OF THE DRAWINGS

The above and other objects and features of the present disclosure will become apparent by describing in detail example embodiments thereof with reference to the accompanying drawings.

DETAILED DESCRIPTION

Below, some example embodiments of the present disclosure will be described in detail and clearly to such an extent that one skilled in the art easily carries out the present disclosure.

Figure 1:
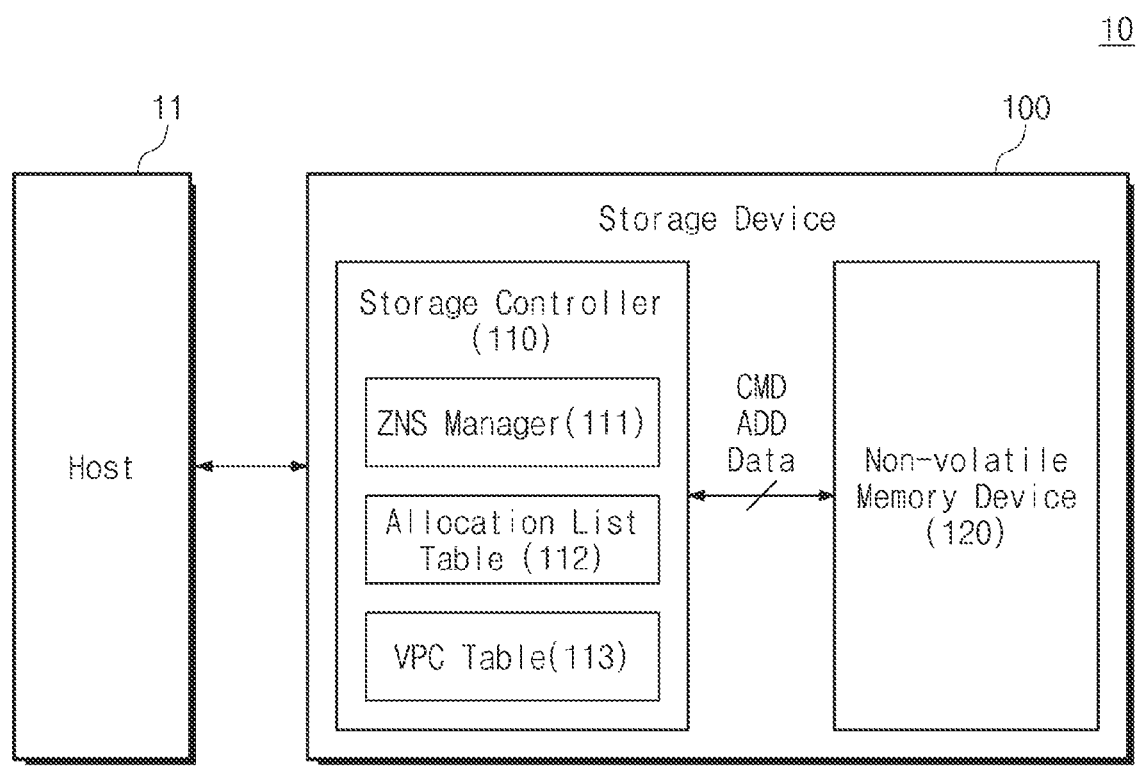
FIG. 1 is a block diagram of a storage system according to some example embodiments of the present disclosure.

FIG. 1 is a block diagram of a storage system according to some example embodiment of the present disclosure. Referring to FIG. 1, a storage system 10 may include a host 11 and a storage device 100. In some example embodiments, the storage system 10 may be a computing system, which is configured to process a variety of information, such as a personal computer (PC), a notebook, a laptop, a server, a workstation, a tablet PC, a smartphone, a digital camera, and a black box.

The host 11 may control an overall operation of the storage system 10. For example, the host 11 may store data in the storage device 100 or may read data stored in the storage device 100. For example, the host 11 may provide write data to the storage device 100, or the host 11 may request read data stored in the storage device 100.

The storage device 100 may include a storage controller 110 and a non-volatile memory device 120. The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

In some example embodiments, the storage device 100 may allocate corresponding memory blocks to a zone depending on a request of the host 11 and may sequentially store data in the allocated memory blocks. The zone may be conceptually referred to as some memory blocks physically continuous to each other from among a plurality of memory blocks. For example, the storage controller 110 and the non-volatile memory device 120 may support the zoned namespace (ZNS) standard of the non-volatile memory express (NVMe). The ZNS standard will be described in detail with reference to FIGS. 4 and 5.

In some example embodiments, the non-volatile memory device 120 may be a NAND flash memory device, but the present disclosure is not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

The storage controller 110 may include a zoned namespace (ZNS) manager 111, an allocation list table 112, and a valid page count (VPC) table 113.

The ZNS manager 111 may communicate with the host 11 and the non-volatile memory device 120. The ZNS manager 111 may receive requests complying with the ZNS standard from the host 11 and may process the requests complying with the ZNS standard. For example, depending on a request of the host 11, the ZNS manager 111 may change a state of a zone (i.e., may allow a state of a zone to transition), may allocate memory blocks to a zone or may deallocate (or release) the allocated memory blocks, and may generate a physical erase request for a memory block not including valid data. The deallocated memory block may be referred to as a "free memory block". The free memory block may be used to store data according to a write request. When a speed at which a free memory block is prepared is improved, the write latency may decrease.

In some example embodiments, the ZNS manager 111 may support both the page-based deallocation and the chunk-based deallocation. The chunk may refer to a series of data sets. For example, in the ZNS standard, the chunk may refer to all the data allocated to a target zone. Because the ZNS standard supports a sequential write operation, physical pages in a memory block may store only data belonging to the same chunk. Under the premise of the sequentially of data, the ZNS manager 111 may support the deallocation of a memory block unit (e.g., the simultaneous erase of all the pages of a memory block and generating a physical erase request), as well as the deallocation of a page unit of a memory block (e.g., the deletion of a page-based mapping relationship between a logical address and a physical address). This will be described in detail with reference to FIGS. 10 and 11.

The allocation list table 112 may manage a plurality of allocation list information respectively corresponding to a plurality of zones that the storage controller 110 manages. The allocation list information may indicate index numbers of all the memory blocks allocated to the corresponding zone. For example, in the case where a first memory block and a second memory block are allocated to a first zone, allocation list information of the first zone may indicate the first memory block and the second memory block as all the memory blocks allocated to the first zone. The allocation list information may be used to search for all the memory blocks allocated to the corresponding zone. The allocation list information will be described in detail with reference to FIGS. 6 and 7.

In some example embodiments, whenever a change of block allocation is made, the ZNS manager 111 may update the allocation list information of the allocation list table 112. For example, when a request for allocating a new memory block is received from the host 11, the ZNS manager 111 may update the allocation list information of the allocation list table 112. When a request for deallocating a previously allocated memory block is received from the host 11, the ZNS manager 111 may update the allocation list information of the allocation list table 112.

The VPC table 113 may manage a VPC value of at least one memory block allocated to each of the plurality of zones that the storage controller 110 manages. The VPC value may be managed in units of memory block and may indicate the number of valid physical pages of a plurality of physical pages in the corresponding memory block.

For example, the storage controller 110 may further include a mapping table that manages a mapping relationship between a logical address received from the host 11 and a physical address of a memory block of the non-volatile memory device 120. The ZNS manager 111 may update the VPC value of the VPC table 113 with reference to the mapping table. When all the mapping relationships of the target memory block are removed (or unmapped) in the mapping table, the ZNS manager 111 may change the VPC value of the VPC table 113 to a target value (e.g., "0") and may provide the physical erase request for the target memory block to the non-volatile memory device 120.

As described above, according to some example embodiment of the present disclosure, the storage controller 110 may support the page-based deallocation and the memory block-based deallocation. As such, the storage controller 110 in which a speed at which a free memory block is prepared is improved and a write latency decrease may be provided.

Figure 2:
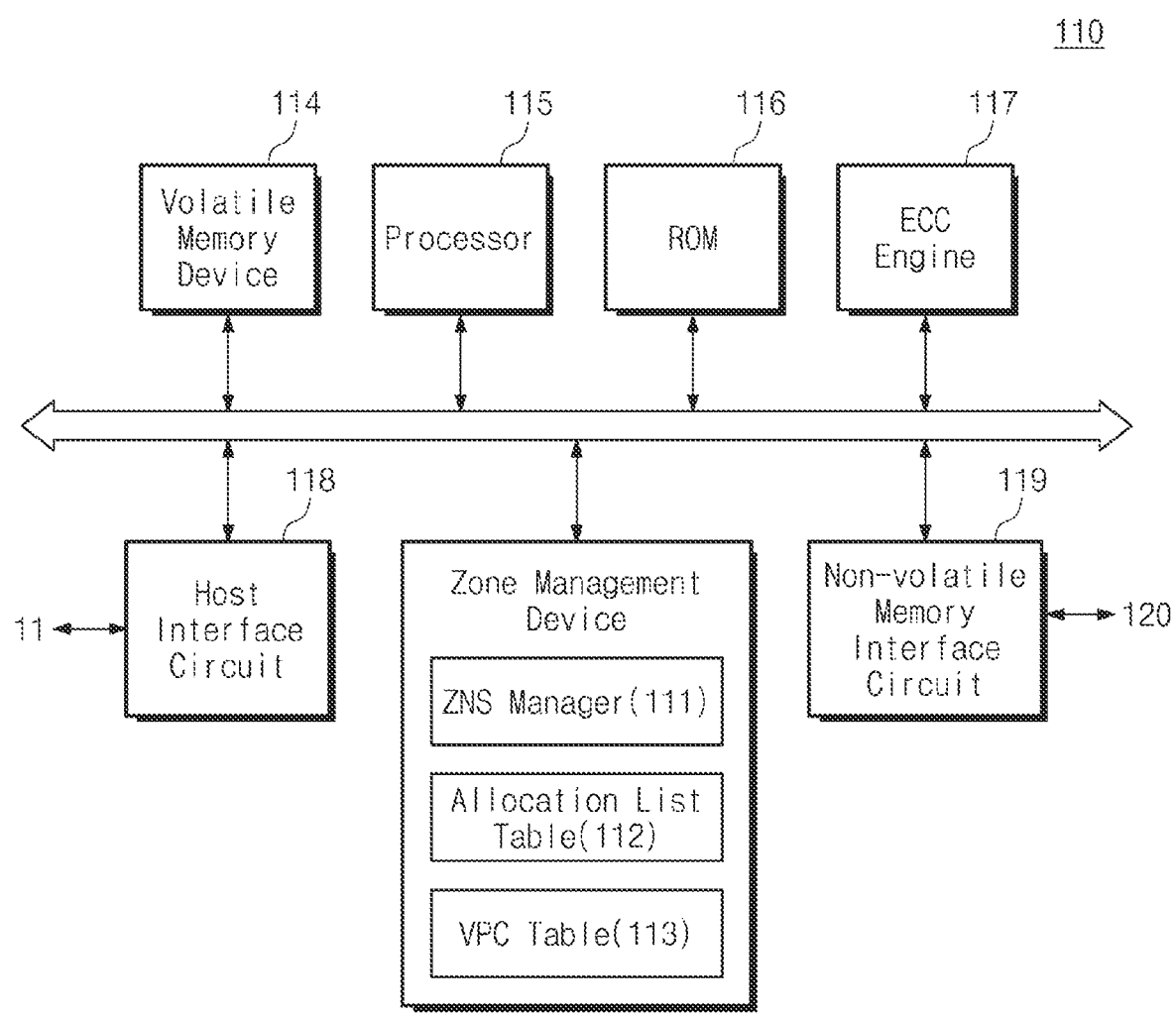
FIG. 2 is a block diagram illustrating a storage controller of FIG. 1 in detail, according to some example embodiments of the present disclosure.

FIG. 2 is a block diagram illustrating a storage controller of FIG. 1 in detail, according to some example embodiments of the present disclosure. Referring to FIGS. 1 and 2, the storage controller 110 may communicate with the host 11 and the non-volatile memory device 120.

The storage controller 110 may include the ZNS manager 111, the allocation list table 112, the VPC table 113, a volatile memory device 114, a processor 115, a read only memory (ROM) 116, an error correcting code (ECC) engine 117, a host interface circuit 118, and a non-volatile memory interface circuit 119.

The ZNS manager 111, the allocation list table 112, and the VPC table 113 may be referred to as, or implemented on, a "zone management device". The zone management device may perform a memory allocation operation and a memory deallocation operation on a plurality of zones. The ZNS manager 111, the allocation list table 112, and the VPC table 113 may respectively correspond to the ZNS manager 111, the allocation list table 112, and the VPC table 113 of FIG. 1.

In some example embodiments, at least a portion of the zone management device may be implemented by firmware or programmable hardware such as field programmable gate array (FPGA). For example, the non-volatile memory device 120 may store instructions corresponding to the zone management device. The processor 115 may load the instructions of the non-volatile memory device 120 onto the volatile memory device 114. The processor 115 may execute the loaded instructions such that the zone management device operates. Processing circuitry such as the processor 115 and the zone management device may implement the ZNS manager 111, allocation list table 112, and VPC table 113. The processing circuitry may operate by executing computer readable instruction stored on the volatile memory device 114 or ROM 116 (or another memory storing instruction thereon for operating the storage controller 110). Accordingly, the processing circuitry of the storage controller 110 may perform all the actions of the ZNS manager 111, allocation list table 112, and VPC table 113 by executing instructions from the volatile memory device 114 and/or the ROM 116 (or another memory storing instruction thereon for operating the storage controller 110).

The volatile memory device 114 may be used as a buffer memory, a main memory, a cache memory, or a working memory of the storage controller 110. For example, the volatile memory device 114 may be implemented with a static random access memory (SRAM) or a dynamic random access memory (DRAM). In some example embodiments, the volatile memory device 114 may include a mapping table. The mapping table may manage a mapping relationship between a logical address and a physical address.

The processor 115 may control an overall operation of the storage controller 110. The ROM 116 may be used as a read only memory that stores information necessary or desired for the operation of the storage controller 110. The ECC engine 117 may detect and correct an error of data read from the non-volatile memory device 120. For example, the ECC engine 117 may have an error correction capability of a given level. The ECC engine 117 may process data having an error level (e.g., the number of flipped bits) exceeding the error correction capability as an uncorrectable error.

The storage controller 110 may communicate with the host 11 through the host interface circuit 118. In some example embodiments, the host interface circuit 118 may be implemented based on at least one of various interfaces such as a serial ATA (SATA) interface, a peripheral component interconnect express (PCIe) interface, a serial attached SCSI (SAS), a nonvolatile memory express (NVMe) interface, and a universal flash storage (UFS) interface. Also, the host interface circuit 118 may support the ZNS standard of the NVMe.

The storage controller 110 may communicate with the non-volatile memory device 120 through the non-volatile memory interface circuit 119. In some example embodiments, the non-volatile memory interface circuit 119 may be implemented based on a NAND interface. Also, the non-volatile memory interface circuit 119 may support a sequential write operation that complies with the ZNS standard of the NVMe.

Figure 3:
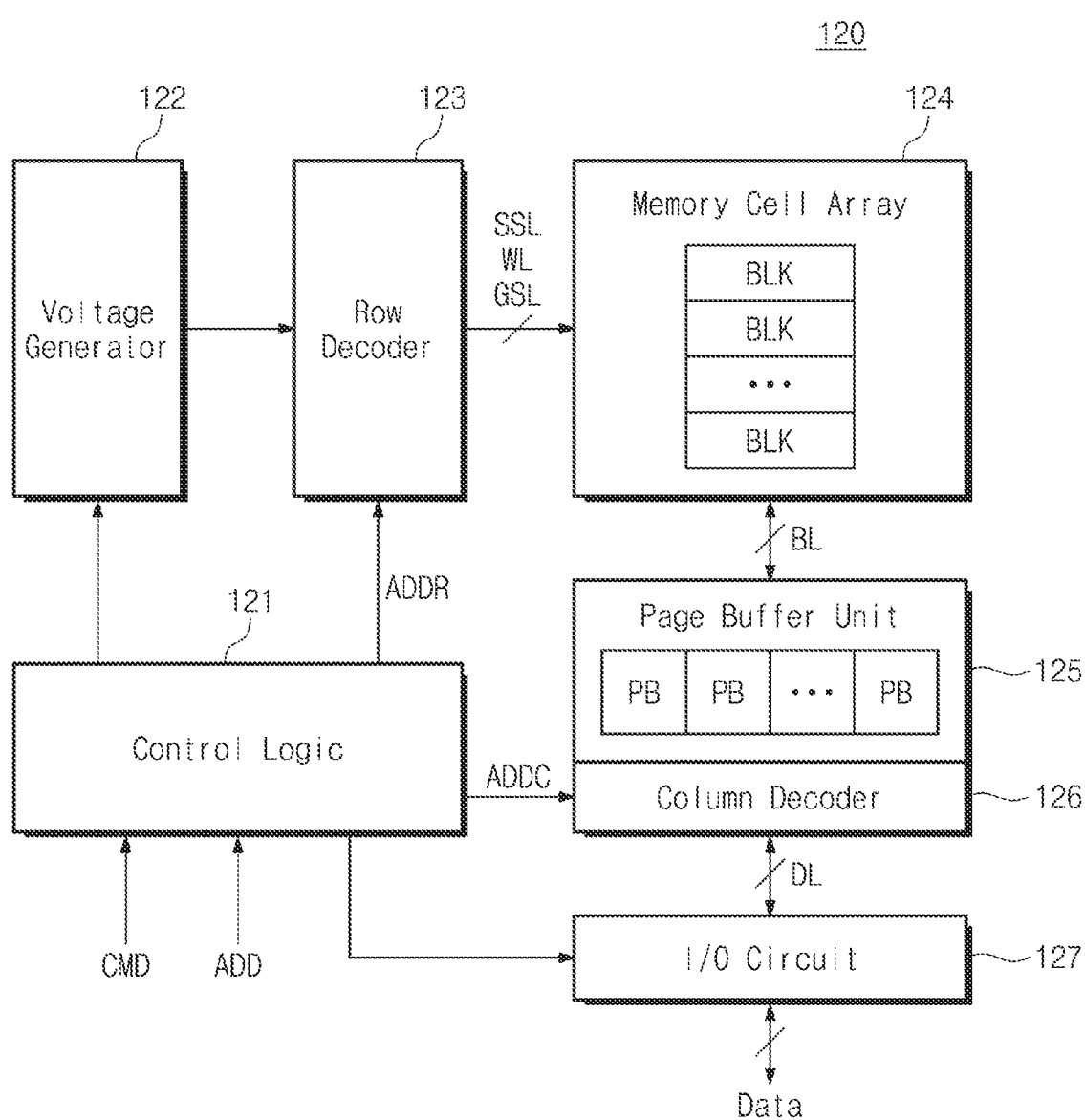
FIG. 3 is a block diagram illustrating a non-volatile memory device of FIG. 1 in detail, according to some example embodiments of the present disclosure.

FIG. 3 is a block diagram illustrating a non-volatile memory device of FIG. 1 in detail, according to some example embodiments of the present disclosure. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include control logic 121, a voltage generator 122, a row decoder 123, a memory cell array 124, a page buffer unit 125, a column decoder 126, and an input/output (I/O) circuit 127.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 121 may control an overall operation of the non-volatile memory device 120 based on the command CMD and the address ADD. The control logic 121 may generate the row address ADDR and the column address ADDC based on the address ADD.

Under control of the control logic 121, the voltage generator 122 may control voltages to be applied to the memory cell array 124 through the row decoder 123.

The row decoder 123 may receive the row address ADDR from the control logic 121. The row decoder 123 may be connected with the memory cell array 124 through string selection lines SSL, word lines WL, and ground selection lines GSL. The row decoder 123 may decode the row address ADDR and may control voltages to be applied to the string selection lines SSL, the word lines WL, and the ground selection lines GSL based on a decoding result and a voltage(s) received from the voltage generator 122.

Depending on voltages applied from the row decoder 123, the memory cell array 124 may store data or may output the stored data. The memory cell array 124 may include a plurality of memory blocks BLK. Each of the plurality of memory blocks BLK may include a plurality of physical pages. The physical pages may store data. In some example embodiments, the memory block BLK may be implemented with a vertical NAND (VNAND)-based memory block.

The page buffer unit 125 may include a plurality of page buffers PB. The page buffer unit 125 may be connected with the memory cell array 124 through bit lines BL. The page buffer unit 125 may read data from the memory cell array 124 in units of page, by sensing voltages of the bit lines BL.

The column decoder 126 may receive the column address ADDC from the control logic 121. The column decoder 126 may decode the column address ADDC and may provide the data read by the page buffer unit 125 to the I/O circuit 127 based on a decoding result.

The column decoder 126 may receive data from the I/O circuit 127 through data lines DL. The column decoder 126 may receive the column address ADDC from the control logic 121. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 124 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

Figure 4:
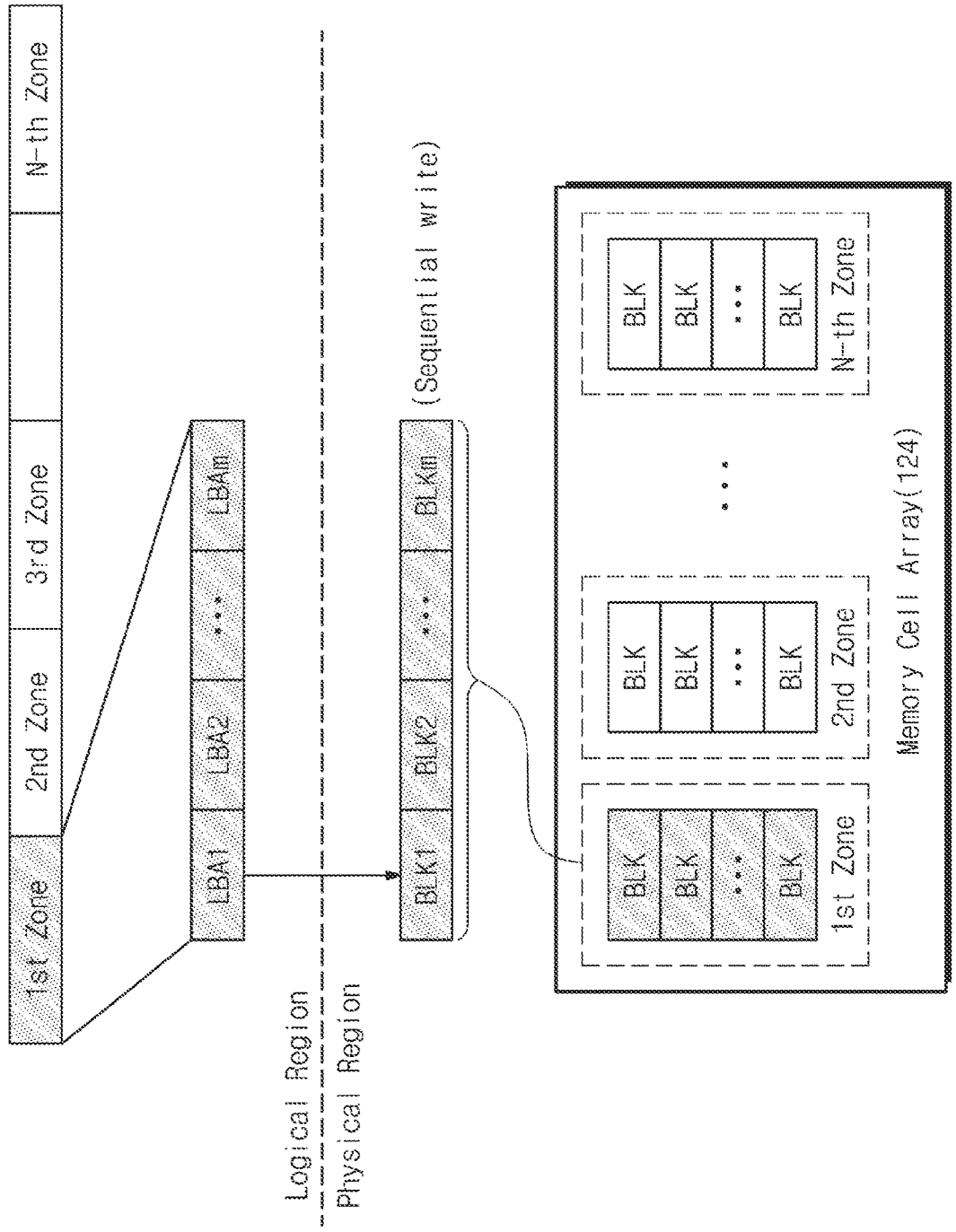
FIG. 4 is a diagram describing a sequential write operation according to some example embodiments of the present disclosure.

FIG. 4 is a diagram describing a sequential write operation according to some example embodiments of the present disclosure. An operation in which the storage controller 110 writes data sequentially in the memory cell array 124 of the non-volatile memory device 120 will be described with reference to FIGS. 1, 3, and 4.

A conventional storage controller may store data depending on a random access. For example, in the case where data are stored depending on the random access, memory blocks corresponding to logically sequential address blocks may be randomly distributed in a non-volatile memory device. The non-volatile memory device may be incapable of being overwritten in structure. In the case of performing the erase operation, the garbage collection operation in which data are read, whether the read data are valid is determined, and data determined to be valid are copied to another memory block may be performed to individually manage valid data and invalid data in a memory block.

The conventional storage controller may frequently perform the garbage collection operation on the entire region of the non-volatile memory device, thereby reducing the lifetime of the non-volatile memory device (e.g., increasing the number of program/erase (P/E) cycles). Also, as a large over provisioning (OP) region is allocated for frequent garbage collection, wear leveling, and bad block management, an available storage capacity of the non-volatile memory device may be decreased.

According to some example embodiments of the present disclosure, the storage controller 110 may perform the sequential write operation. For better understanding of the present disclosure, a logical region of first to N-th zones and a physical region of first to N-th zones are illustrated together. Herein, "N" is an arbitrary natural number. The logical region may include logical addresses capable of being identified by the host 11. The physical region may include locations or addresses of memory blocks in the non-volatile memory device 120. The logical region and the physical region may have a mapping relationship.

Referring to the logical region, the storage controller 110 may manage the first to N-th zones. The first to N-th zones may be managed independently of each other. For example, the host 11 may execute a first application and a second application. The first application may manage data included in the first zone. The second application may manage data included in the second zone. That is, data having similar purposes and use periods from among the data managed by the same application may be managed within the same zone.

Each of the first to N-th zones may include a plurality of logical block addresses. For example, the first zone may include first to m-th logical block addresses LBA1 to LBAm. Herein, "m" is an arbitrary natural number. The first to m-th logical block addresses LBA1 to LBAm may be logically sequential.

The storage controller 110 may store data sequentially in the memory cell array 124 by using a write pointer. For example, in the case where data corresponding to the first logical block address LBA1 and the second logical block address LBA2 are sequentially programmed in the memory cell array 124 and a buffer memory of the storage controller 110 stores data corresponding to the third logical block address LBA3, the write pointer may indicate the third logical block address LBA3.

Referring to the physical region, the memory cell array 124 may include the plurality of blocks BLK. The plurality of blocks BLK may be classified into the first to N-th zones. The plurality of blocks BLK of the first zone may be first to m-th memory blocks BLK1 to BLKm that are physically sequential. The first to m-th memory blocks BLK1 to BLKm of the first zone may respectively correspond to the first to m-th logical block addresses LBA1 to LBAm of the first zone. The storage controller 110 may manage data received from the host 11 depending on the write request, so as to be stored in the memory cell array 124 logically and physically sequentially. That is, the storage controller 110 may support a sequential write operation.

For better understanding of the present disclosure, the description is given as a logical block address corresponds to one block, but the present disclosure is not limited thereto. Logical block addresses may respectively correspond to sequential sub-blocks or sequential programming units in one block (e.g., a unit by which memory cells are programmed), while maintaining the logical sequentially. The correspondence relationship of the logical block address and the memory block may be variously changed and carried out by one skilled in the art.

As described above, according to some example embodiments of the present disclosure, the storage controller 110 may manage data in units of zone, instead of randomly managing data with respect to the entire region of the memory cell array 124. As data management is made in units of zone, the I/O load and additional read and write operations due to garbage collection (GC) may decrease. Accordingly, a data processing speed of the storage device 100 may be improved, and the power consumption of the storage device 100 may decrease. Also, as the load due to the garbage collection decreases, the over provisioning (OP) region may be reduced. This may mean that an available storage capacity of the non-volatile memory device 120 increases.

Figure 5:
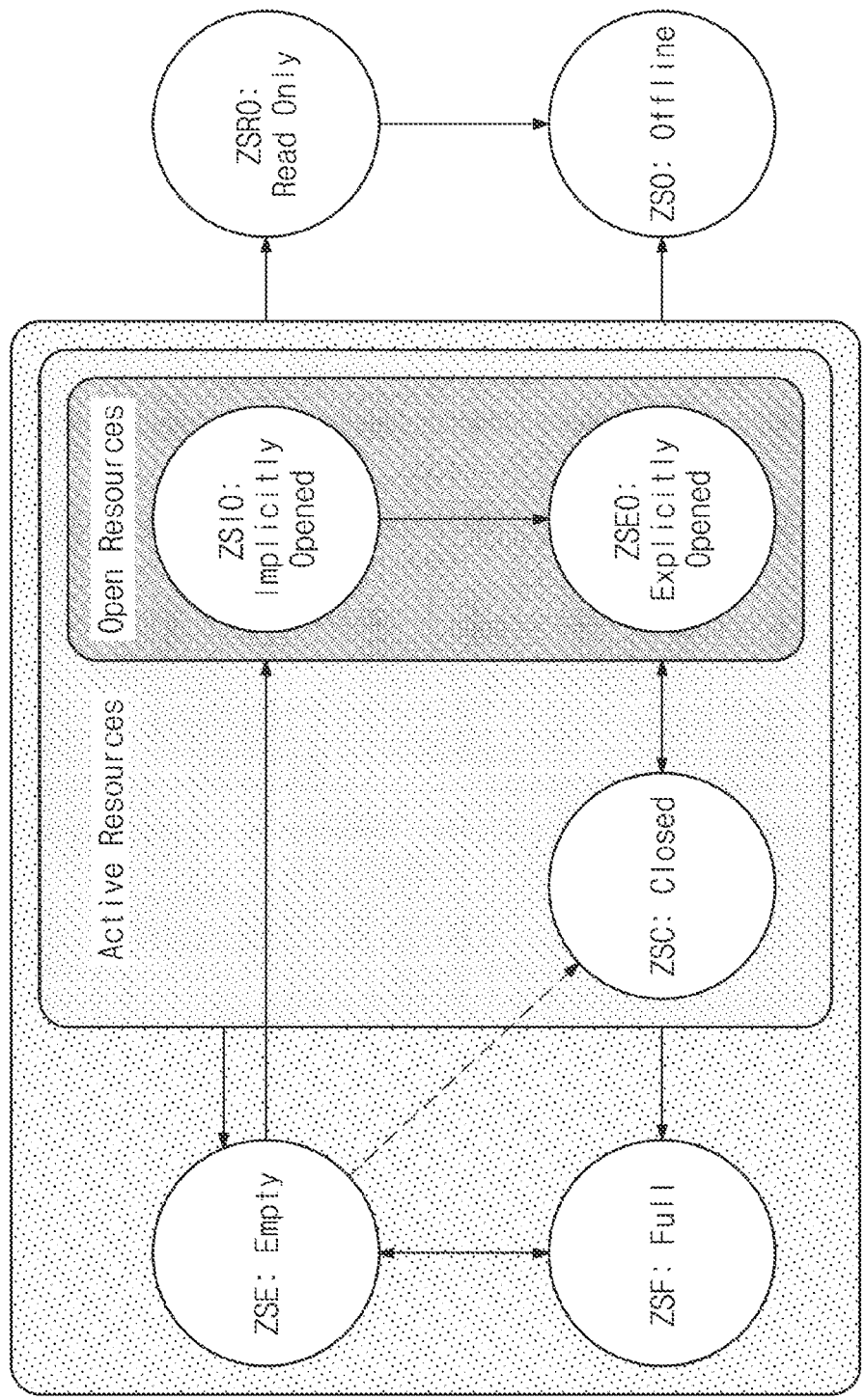
FIG. 5 is a diagram describing states of a storage device according to some example embodiments of the present disclosure.

FIG. 5 is a diagram describing states of a storage device according to some example embodiments of the present disclosure. A state machine associated with zones of the storage device 100 according to the ZNS standard will be described with reference to FIGS. 1 and 5.

According to some example embodiments of the present disclosure, zones managed by the storage device 100 may have one of a zones space empty (ZSE) state, a zones space implicitly opened (ZSIO) state, a zones space explicitly opened (ZSEO) state, a zones space closed (ZSC) state, a zones space full (ZSF) state, a zones space read only (ZSRO) state, and a zones space offline (ZSO) state. As the storage device 100 processes a request received from the host 11, a state of a zone may transition.

The ZSE state, the ZSF state, the ZSRO state, and the ZSO state may be classified as a non-active state. The ZSIO state, the ZSEO state, and the ZSC state may be classified as an active state. Zones of the active state may be limited by a maximum active resources field. The ZSIO state and the ZSEO state may be classified as an open state. Zones of the open state may be limited by a maximum open resources field.

The ZSE state may indicate an empty state. The ZSE state may refer to a state where data are not yet stored in memory blocks or data of a memory block are physically erased by a reset operation; in this case, the write pointer may indicate the lowest logical block address (e.g., a logical block address having the lowest number from among logical block addresses managed by a zone). The write pointer of the ZSE state may be valid. The ZSE state may transition to one of the ZSIO state, the ZSEO state, the ZSC state, and the ZSF state.

The ZSIO state may indicate an implicitly opened state. The ZSIO state may be a state implicitly opened by executing a write command received from the host 11. In the ZSIO state, a memory block may store data corresponding to the write command The ZSIO state may transition to one of the ZSE state, the ZSEO state, the ZSC state, and the ZSF state. When an open resource is saturated, the ZSIO state may transition to the ZSC state even though there is no close command The ZSEO state may indicate an explicitly opened state. The ZSEO state may be a state explicitly opened by executing an open command received from the host 11. In the ZSEO state, a memory block may store data corresponding to a write command received subsequently. The ZSEO state may transition to one of the ZSE state, the ZSC state, and the ZSF state. The ZSEO state may have a higher priority to an open resource than the ZSIO state. The ZSEO state may transition to the ZSC state only by the close command The ZSC state may indicate a closed state. The transition to the ZSC state may be made 1) when, in the ZSE state, usable active resources are present and a set zone descriptor extension command is received, 2) when, in the ZSIO state, the close command is received or an open resource is saturated, or 3) when, in the ZSEO state, the close command is received. In the ZSC state, a memory block is incapable of storing data corresponding to the write command The ZSC state may transition to one of the ZSE state, the ZSIO state, the ZSEO state, and the ZSF state.

The ZSF state may indicate a full state. In the ZSE state, memory blocks may be filled with data stored therein, and the write pointer may indicate the highest logical block address (e.g., a logical block address having the greatest number from among logical block addresses managed by a zone). The write pointer of the ZSF state may be invalid. The ZSF state may transition to the ZSE state by a command indicating a reset of a zone.

The ZSRO state may indicate a read only state. A zone having the ZSRO state may be a space where a host continues to use a zoned namespace after a portion of performance of a zone stops an operation. The ZSRO state may transition to the ZSO state by an offline zone command.

The ZSO state may indicate an offline state. The ZSO state may not have a valid write pointer, may not have active resources, and may not have open resources. The ZSO state may not have any other state capable of transitioning.

In some example embodiments, the storage device 100 may perform a zone send action for resetting a zone depending on a zone management send command For example, a target zone of the storage device 100 may operate in the ZSIO state, the ZSEO state, the ZSC state, or the ZSF state. The storage device 100 may receive the zone management send command for the target zone from the host 11. The zone management send command may indicate the reset operation for the target zone, and may indicate the transition of the target zone to the ZSE state. The storage device 100 may perform the zone send action depending on the zone management send command.

Figure 6:
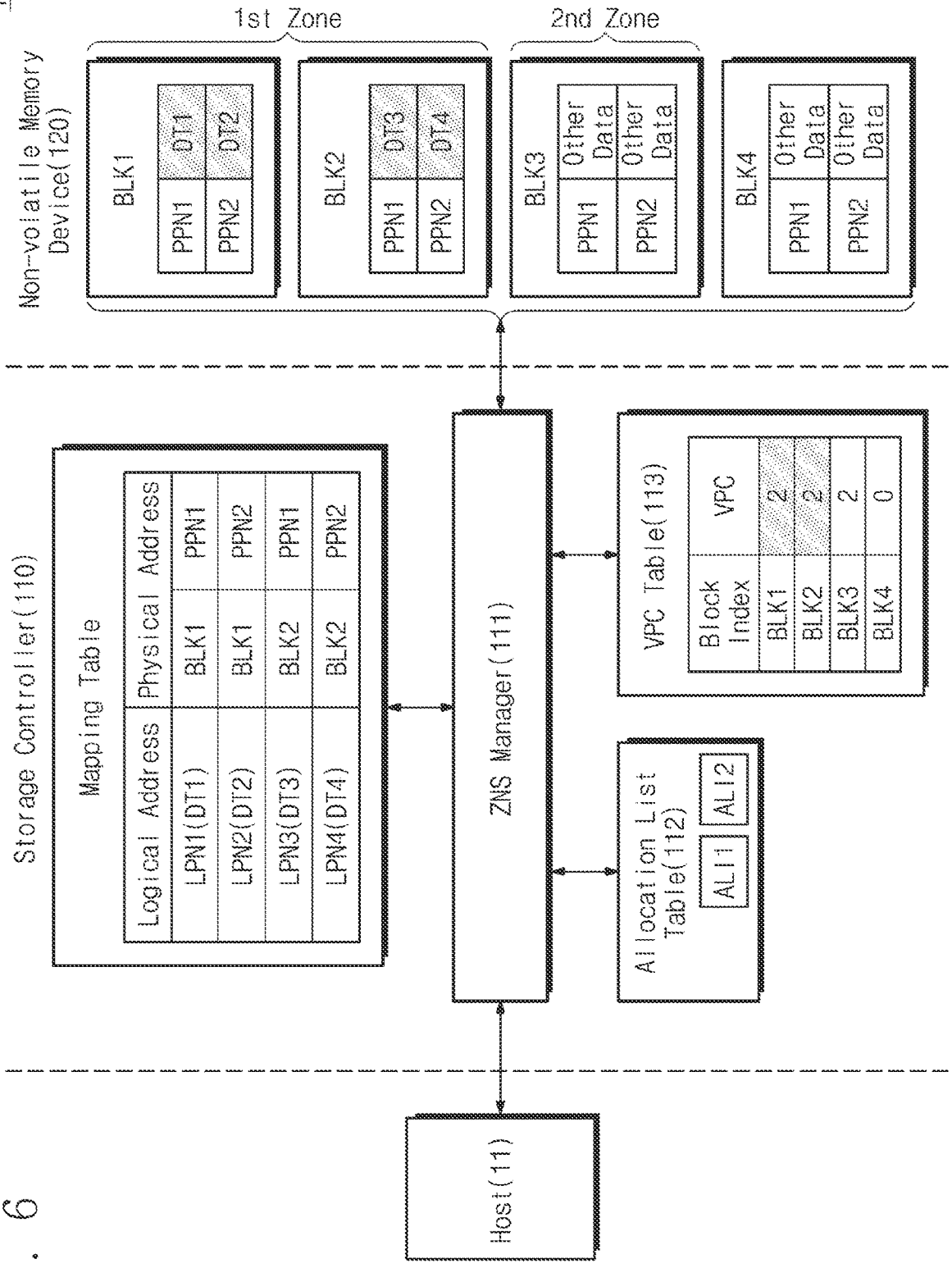
FIG. 6 is a diagram describing a storage system according to some example embodiments of the present disclosure.

FIG. 6 is a diagram describing a storage system according to some example embodiments of the present disclosure. Referring to FIG. 6, the storage system 10 may include the host 11, the storage controller 110, and the non-volatile memory device 120.

The host 11 may communicate with the storage controller 110. The host 11 may provide the storage controller 110 with requests (e.g., an erase request for a reset operation, an open request for a state transition to an open state, and a write request for storing data) satisfying the ZNS standard. The host 11 may receive responses corresponding to some requests from the storage controller 110.

The storage controller 110 may include the mapping table, the ZNS manager 111, the allocation list table 112, and the VPC table 113.

The ZNS manager 111 may communicate with the host 11, the mapping table, the allocation list table 112, the VPC table 113, and the non-volatile memory device 120. The ZNS manager 111 may process a request from the host 11, may allocate a new block to a zone or may deallocate the allocated block, and may manage the physical erase operation of the memory block of the non-volatile memory device 120.

The mapping table may manage a mapping relationship between a logical address and a physical address. The mapping table may be managed by the ZNS manager 111. The mapping table may be implemented on the volatile memory device 114 of FIG. 2. The logical address may indicate a logical page number received from the host 11. The logical page number may indicate a location of data capable of being identified by the host 11. The physical address may include a physical page number of a memory block of the non-volatile memory device 120. The physical page number may indicate a location of data stored in the non-volatile memory device 120.

For example, the host 11 may provide the write request for first to fourth data DT1 to DT4 to the storage controller 110. The first to fourth data DT1 to DT4 may respectively correspond to first to fourth logical page numbers LPN1 to LPN4 that are logically sequential. The ZNS manager 111 may allocate the first memory block BLK1 and the second memory block BLK2 of the non-volatile memory device 120 to the first zone, based on the write request or the previously received open request. The first memory block BLK1 may include a first physical page and a second physical page that are physically sequential. The second memory block BLK2 may include a first physical page and a second physical page that are physically sequential.

The ZNS manager 111 may map the first logical page number LPN1 onto a first physical page number PPN1 of the first memory block BLK1, may update the mapping relationship of the mapping table, and may store the first data DT1 at the first physical page of the first memory block BLK1.

The ZNS manager 111 may map the second logical page number LPN2 onto a second physical page number PPN2 of the first memory block BLK1, may update the mapping relationship of the mapping table, and may store the second data DT2 at the second physical page of the first memory block BLK1.

The ZNS manager 111 may map the third logical page number LPN3 onto a first physical page number PPN1 of the second memory block BLK2, may update the mapping relationship of the mapping table, and may store the third data DT3 at the first physical page of the second memory block BLK2.

The ZNS manager 111 may map the fourth logical page number LPN4 onto a second physical page number PPN2 of the second memory block BLK2, may update the mapping relationship of the mapping table, and may store the fourth data DT4 at the second physical page of the second memory block BLK2.

Meanwhile, the third memory block BLK3 may store any other data, but to prevent or hinder a drawing from being complicated, a mapping relationship between a first physical page number PPN1 and a second physical page number PPN2 of the third memory block BLK3 may be omitted.

For better understanding of the example embodiments, the description is given as the first memory block BLK1 and the second memory block BLK2 are allocated to the first zone and one memory block includes two physical pages, but the example embodiments is not limited thereto. The number of memory blocks to be allocated to one zone may increase or decrease, and the number of physical pages to be included in one memory block may increase or decrease.

The allocation list table 112 may manage a plurality of allocation list information respectively corresponding to a plurality of zones that the storage controller 110 manages. The allocation list information may indicate index numbers of all the memory blocks allocated to the corresponding zone.

For example, the allocation list table 112 may manage first allocation list information ALI1 and second allocation list information ALI2. The first allocation list information ALI1 may indicate the first memory block BLK1 and the second memory block BLK2 as all the memory blocks allocated to the first zone. The first allocation list information ALI1 may be used to search for all the memory blocks allocated to the first zone. When a new memory block is allocated to the first zone or the previously allocated memory block is deallocated, the ZNS manager 111 may update the first allocation list information ALI1 of the allocation list table 112.

As in above description, the second allocation list information ALI2 may indicate the third memory block BLK3 as all the memory blocks allocated to the second zone. The second allocation list information ALI2 may be used to search for all the memory blocks allocated to the second zone. When a new memory block is allocated to the second zone or the previously allocated memory block is deallocated, the ZNS manager 111 may update the second allocation list information ALI2 of the allocation list table 112.

The VPC table 113 may manage a VPC value of at least one memory block allocated to each of the plurality of zones that the storage controller 110 manages. A block index item of the VPC table 113 may indicate a number for identifying a corresponding block. A VPC item of the VPC table 113 may indicate a VPC value of a corresponding block. The VPC value may be managed in units of memory block and may indicate the number of valid physical pages of a plurality of physical pages in the corresponding memory block.

For example, under control of the ZNS manager 111, the VPC table 113 may manage the VPC value of the first memory block BLK1 set to "2", may manage the VPC value of the second memory block BLK2 set to "2", may manage the VPC value of the third memory block BLK3 set to "2", and may manage the VPC value of the fourth memory block BLK4 set to "0".

In some example embodiments, the ZNS manager 111 may update the VPC table 113 with reference to the mapping table.

For example, the ZNS manager 111 may receive the write request for the first and second data DT1 and DT2 from the host 11. The ZNS manager 111 may update mapping relationships of the first and second physical page numbers PPN1 and PPN2 of the first memory block BLK1 in the mapping table. The ZNS manager 111 may set the VPC value of the first memory block BLK1 in the VPC table 113 to "2" with reference to the mapping table.

When the erase request for the first memory block BLK1 is received from the host 11, the ZNS manager 111 may unmap the mapping relationships of the first and second physical page numbers PPN1 and PPN2 of the first memory block BLK1 in the mapping table and may change the VPC value of the first memory block BLK1 in the VPC table 113 from "2" to "0". When the VPC value is changed to "0", the ZNS manager 111 may provide the non-volatile memory device 120 with a physical erase request for a corresponding memory block.

The non-volatile memory device 120 may include the first to fourth memory blocks BLK1 to BLK4. Each of the first to fourth memory blocks BLK1 to BLK4 may include first and second physical pages, and the first and second physical pages may be distinguished by the first and second physical page numbers PPN1 and PPN2. The first and second physical pages may be physically sequential.

The ZNS manager 111 may manage the plurality of memory blocks in a state of dividing the plurality of memory blocks in the non-volatile memory device 120 into zones. For example, the ZNS manager 111 may allocate the first and second memory blocks BLK1 and BLK2 to the first zone and may store the first to fourth data DT1 to DT4 associated with the first zone in the first and second memory blocks BLK1 and BLK2. The ZNS manager 111 may allocate the third memory block BLK3 to the second zone and may store any other data associated with the third zone in the third memory block BLK3.

In some example embodiments, the storage controller 110 may support the sequential write operation. The first and second physical page numbers PPN1 and PPN2 of the first memory block BLK1 allocated to the first zone of the non-volatile memory device 120 and the first and second physical page numbers PPN1 and PPN2 of the second memory block BLK2 allocated to the first zone may be sequential physical page numbers and may be respectively mapped onto the first to fourth logical page numbers LPN1 to LPN4 logically sequential.

Figure 7:
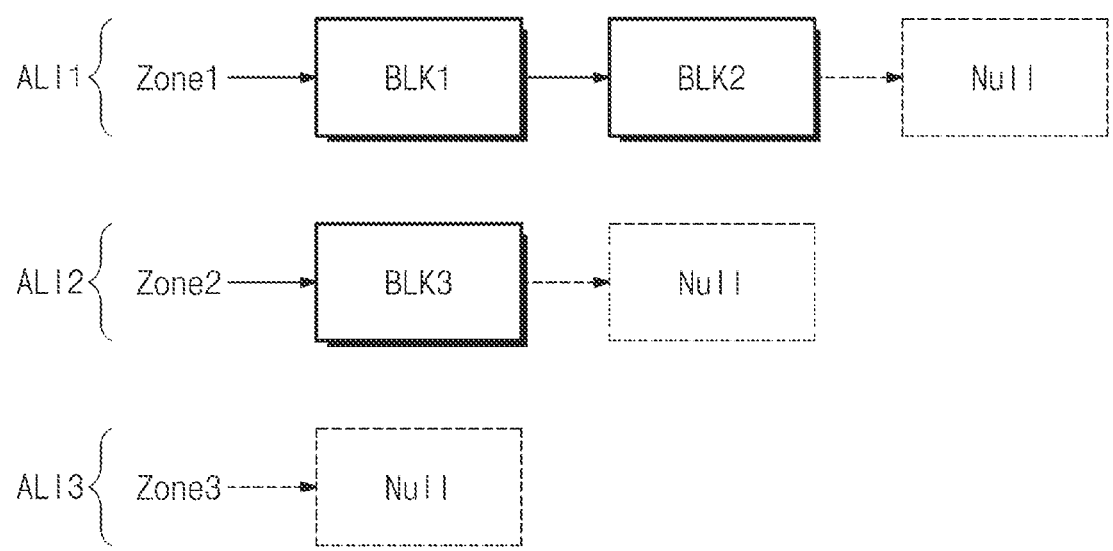
FIG. 7 is a diagram for describing a data structure of allocation list information according to some example embodiments of the present disclosure.

FIG. 7 is a diagram for describing a data structure of allocation list information according to some example embodiments of the present disclosure. A data structure of allocation list information that is managed by the allocation list table 112 will be described with reference to FIGS. 6 and 7.

The data structure of the allocation list information has a format of a linked-list. The linked-list may refer to a form in which each node has data and a pointer and nodes are connected in a single line.

Referring to the first allocation list information ALI1, the data structure may indicate that the first memory block BLK1 is allocated in the first zone and the second memory block BLK2 is allocated in the first zone after the first memory block BLK1 is allocated. Because another memory block is not yet allocated after the second memory block BLK2 is allocated, the second memory block BLK2 may indicate a null.

When another memory block is further allocated to the first zone, the ZNS manager 111 may update the first allocation list information ALI1 so as to further point to the another memory block after the second memory block BLK2.

When the second memory block BLK2 is deallocated in the first zone, the ZNS manager 111 may update the first allocation list information ALI1 such that the second memory block BLK2 is removed and the first memory block BLK1 indicates a null.

Referring to the second allocation list information ALI2, the data structure may indicate that the third memory block BLK3 is allocated to the second zone. Because another memory block is not yet allocated after the third memory block BLK3 is allocated, the third memory block BLK3 may indicate a null.

Referring to third allocation list information ALI3, the data structure may indicate that a memory block is not yet allocated to the third zone. For example, the third allocation list information ALI3 may indicate a null.

As described above, according to some example embodiments of the present disclosure, the data structure of the allocation list information may have the linked-list format. The linked-list may be appropriate for quickly searching for memory blocks allocated to a target zone and may be appropriate for quickly updating an allocation change when the allocation or deallocation of a memory block is made. In an operation, in which all the memory blocks allocated to a zone are simultaneously or contemporaneously emptied out (or unmapped) or deleted, such as a zone reset operation, the ZNS manager 111 may check memory blocks with reference to the allocation list information with the linked-list format and may deallocate the checked memory blocks. According to the optimized data structure, a speed at which a free memory block is prepared may be improved, and the write latency may decrease.

Figure 8:
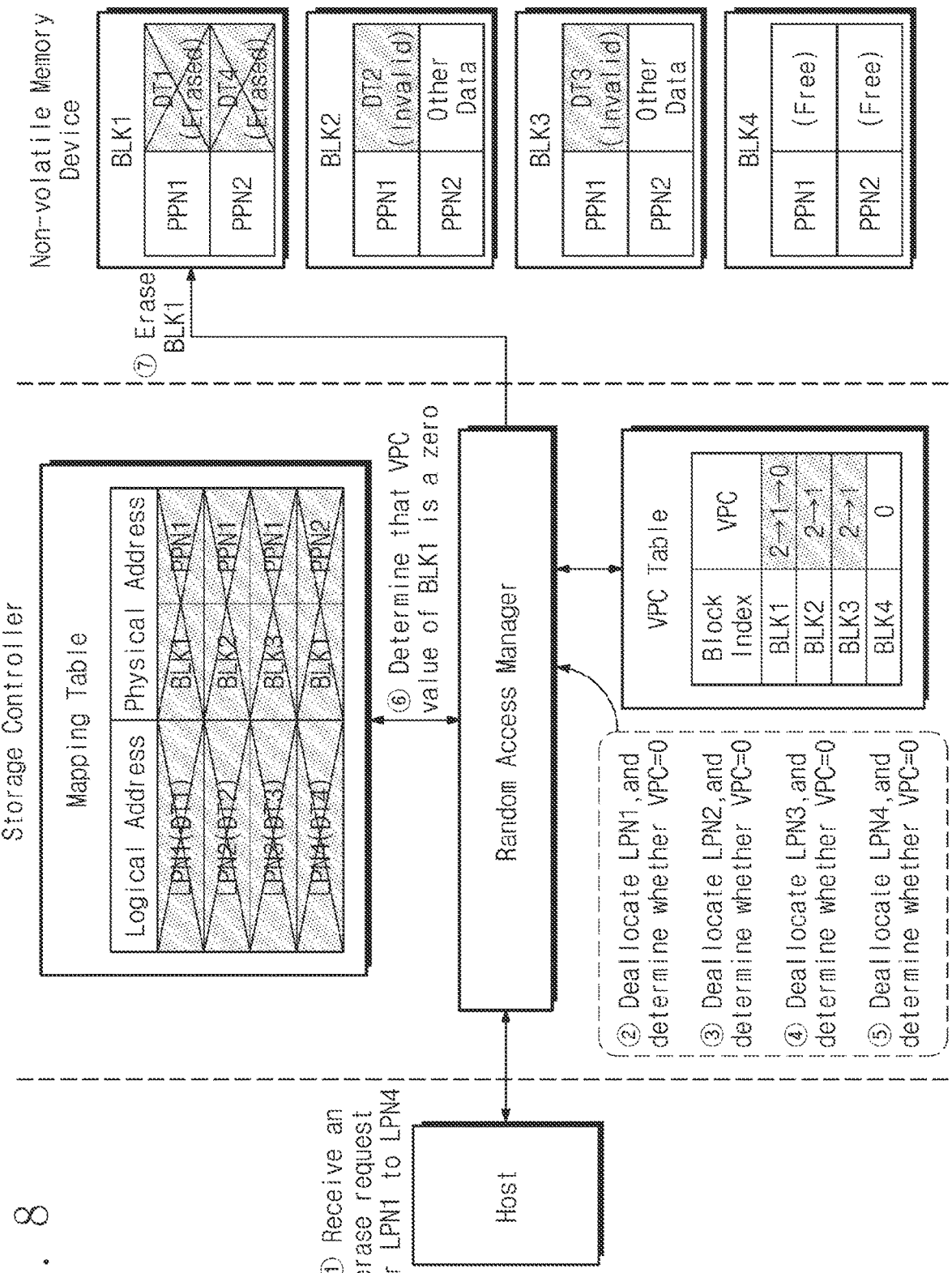
FIG. 8 is a diagram describing a deallocation operation of a conventional storage system.

FIG. 8 is a diagram describing a deallocation operation of a conventional storage system. A page-based deallocation operation of a conventional storage system SS will be described with reference to FIG. 8.

For better understanding of the example embodiments, the deallocation operation of the conventional storage system SS will be described. However, the following descriptions may include technical features not associated with the related art, and the following descriptions are not intended to limit the example embodiments.

The conventional storage system SS may include a host, a storage controller, and a non-volatile memory device. The host and the non-volatile memory device may respectively correspond to the host 11 and the non-volatile memory device 120 of FIG. 6. The storage controller may include a mapping table, a random access manager, and a VPC table. The mapping table and the VPC table may respectively correspond to the mapping table and the VPC table 113 of FIG. 6.

The random access manager may support a random write operation and a page-based deallocation operation. Memory blocks of the non-volatile memory device may distribute and store data depending on the random write operation. Data with similar purposes and use periods may be distributed and stored in plural memory blocks. The random access manager may deallocate data distributed to plural memory blocks in units of page.

Below, the deallocation operation of the conventional storage system SS will be described.

In a first operation ①, the random access manager may receive an erase request from the host. The erase request may indicate erasing the first to fourth data DT1 to DT4 respectively corresponding to the first to fourth logical page numbers LPN1 to LPN4. The first data DT1 may be present in the first physical page of the first memory block BLK1. The second data DT2 may be present in the first physical page of the second memory block BLK2. The third data DT3 may be present in the first physical page of the third memory block BLK3. The fourth data DT4 may be present in the second physical page of the first memory block BLK1.

In a second operation ②, the random access manager may deallocate the first logical page number LPN1. For example, the deallocation may include deleting a mapping relationship between the first logical page number LPN1 and the first physical page number PPN1 of the first memory block BLK1 in the mapping table. After the random access manager deletes the mapping relationship, the random access manager may decrease the VPC table of the first memory block BLK1 in the VPC table from "2" to "1". The random access manager may determine whether the decreased VPC value is a target value (e.g., "0").

When it is determined that the decreased VPC value is not the target value, a memory block corresponding to the decreased VPC value may include at least one valid page. The random access manager may delete only the mapping relationship and may not request the non-volatile memory device to physically erase the corresponding memory block. Next, the random access manager may process deallocation for a next page or any other request. In contrast, when it is determined that the decreased VPC value is the target value, the corresponding memory block may not include a valid page. The random access manager may request the non-volatile memory device to physically erase the corresponding memory block.

In a third operation ③, the random access manager may deallocate the second logical page number LPN2. For example, the deallocation may include deleting a mapping relationship between the second logical page number LPN2 and the first physical page number PPN1 of the second memory block BLK2 in the mapping table. After the random access manager deletes the mapping relationship, the random access manager may decrease the VPC table of the second memory block BLK2 in the VPC table from "2" to "1". The random access manager may determine whether the decreased VPC value is the target value.

In a fourth operation ④, the random access manager may deallocate the third logical page number LPN3. For example, the deallocation may include deleting a mapping relationship between the third logical page number LPN3 and the first physical page number PPN1 of the third memory block BLK3 in the mapping table. After the random access manager deletes the mapping relationship, the random access manager may decrease the VPC table of the third memory block BLK3 in the VPC table from "2" to "1". The random access manager may determine whether the decreased VPC value is the target value.

In a fifth operation ⑤, the random access manager may deallocate the fourth logical page number LPN4. For example, the deallocation may include deleting a mapping relationship between the fourth logical page number LPN4 and the second physical page number PPN2 of the first memory block BLK1 in the mapping table. After the random access manager deletes the mapping relationship, the random access manager may decrease the VPC table of the first memory block BLK1 in the VPC table from "1" to "0". The random access manager may determine whether the decreased VPC value is the target value.

In a sixth operation ⑥, the random access manager may determine whether the VPC value of the first memory block BLK1 decreased in the fifth operation ⑤ is the target value. That the VPC value is the target value may mean that there is no valid pages in a memory block corresponding to the VPC value.

In a seventh operation ⑦, the random access manager may erase the first memory block BLK1, based on determining, in the sixth operation ⑥, that the VPC value of the first memory block BLK1 is the target value. For example, the random access manager may provide the physical erase request for the first memory block BLK1 to the non-volatile memory device. The non-volatile memory device may erase data present in the first memory block BLK1 depending on the physical erase request.

Meanwhile, because the second data DT2 of the first physical page in the second memory block BLK2 are invalid but any other data are present at the second physical page of the second memory block BLK2, the second memory block BLK2 may not be physically erased. As in the above description, because the third data DT3 of the first physical page in the third memory block BLK3 are invalid but any other data are present at the second physical page of the third memory block BLK3, the third memory block BLK3 may not be physically erased.

As described above, the conventional storage system SS may support the random write operation and the page-based deallocation operation. As data are distributed to plural memory blocks due to the random write operation, the memory block-based deallocation may be impossible. Also, whenever the random access manager performs the page-based deallocation operation and deallocate a page, an operation of checking a VPC value may be required or desired, thereby causing a delay of the preparation of the free memory block and an increase in the write latency. A method of operating a storage controller of the conventional storage system SS will be described in detail with reference to FIG. 9.

Figure 9:
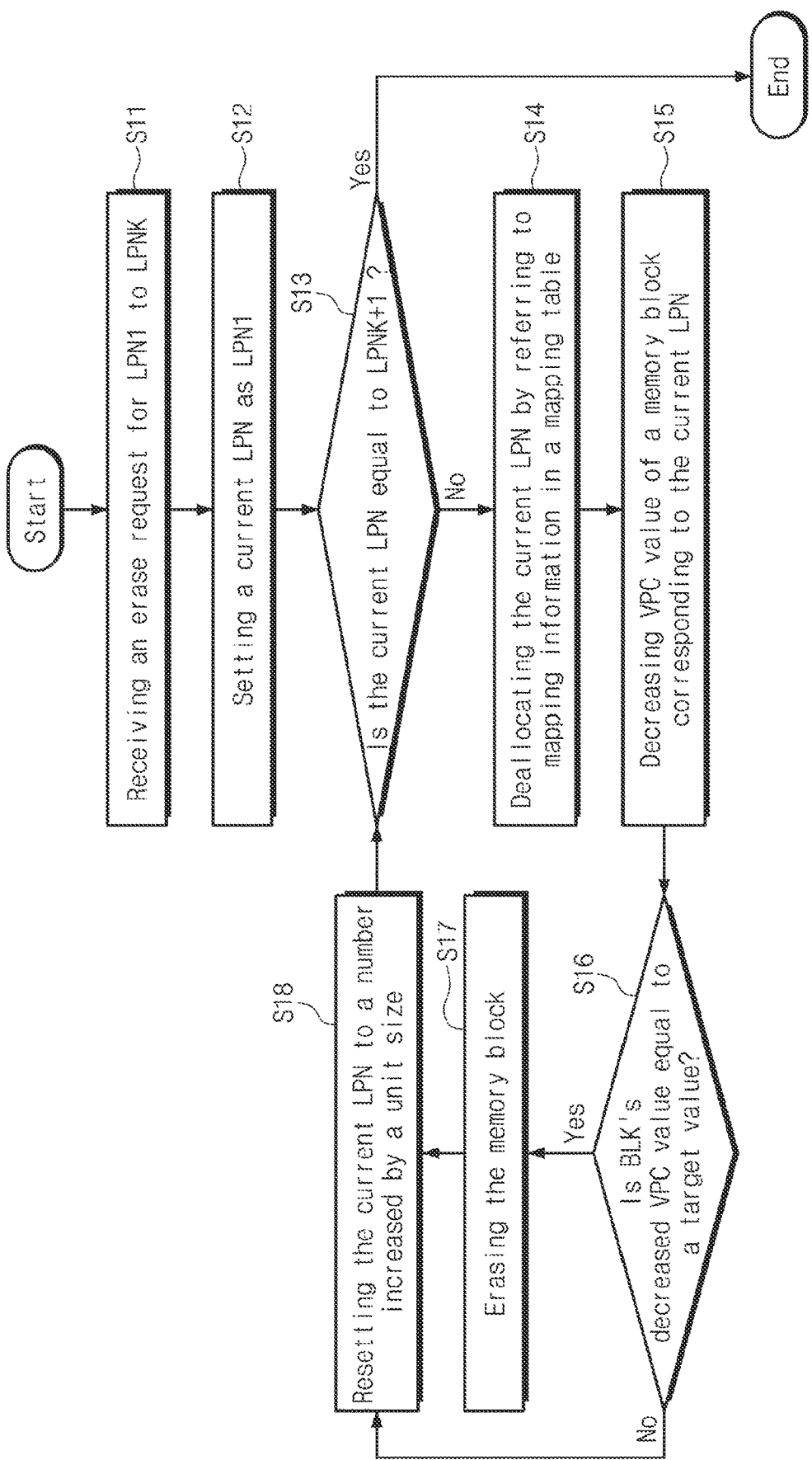
FIG. 9 is a flowchart describing a method of operating a conventional storage controller.

FIG. 9 is a flowchart describing a method of operating a conventional storage controller. Referring to the FIG. 9, a conventional storage controller may communicate with a host and a non-volatile memory device. The conventional storage controller may correspond to a storage controller of the conventional storage system SS of FIG. 8.

In operation S11, the conventional storage controller may receive the erase request for the first logical page number LPN1 to the K-th logical page number LPNK. Herein, "K" is an arbitrary natural number. The first logical page number LPN1 may be a start logical page number of the erase request. The K-th logical page number LPNK may be an end logical page number of the erase request.

In operation S12, the conventional storage controller may set a current logical page number to the first logical page number LPN1.

In operation S13, the conventional storage controller may determine whether the current logical page number is equal to a (K+1)-th logical page number LPNK+1. That the current logical page number is equal to the (K+1)-th logical page number LPNK+1 may mean that the erase request in operation S11 is completely processed. When it is determined that the current logical page number is equal to the (K+1)-th logical page number LPNK+1, the conventional storage controller may end the method. When it is determined that the current logical page number is not equal to the (K+1)-th logical page number LPNK+1, the conventional storage controller may perform operation S14.

In operation S14, the conventional storage controller may deallocate the current logical page number with reference to mapping information of the mapping table. For example, the conventional storage controller may remove a mapping relationship between the current logical page number and a corresponding physical page number from the mapping table.

In operation S15, the conventional storage controller may decrease a VPC value of a memory block corresponding to the current logical page number. For example, the conventional storage controller may decrease a VPC value of a memory block having the physical page number corresponding to the logical page number deallocated in operation S14 by a unit value (e.g., "1").

In operation S16, the conventional storage controller may determine whether the decreased VPC value is equal to a target value. For example, the target value may be "0". When it is determined that the decreased VPC value is equal to the target value, the conventional storage controller may perform operation S17. When it is determined that the decreased VPC value is not equal to the target value, the conventional storage controller may perform operation S18.

In operation S17, the conventional storage controller may erase the memory block whose VPC value is the target value. For example, the memory block whose VPC value is the target value may be a memory block that does not include a valid page. The conventional storage controller may provide the physical erase request for the memory block to the non-volatile memory device, based on that the VPC value is decreased to the target value.

In operation S18, the conventional storage controller may reset the current logical page number to a number increased by a unit value (e.g., "1"). That is, the conventional storage controller may prepare deallocation of a next logical page number or may prepare processing completion of the erase request in operation S11.

After operation S18 is performed, the conventional storage controller may again perform operation S13. In operation S13 thus again performed, the current logical page number may be the logical page number that is reset in operation S18. The conventional storage controller may repeatedly perform operation S13 to operation S18 until it is determined in operation S13 that the current logical page number is equal to the (K+1)-th logical page number LPNK+1.

As described above, the conventional storage controller may perform the page-based deallocation operation for the purpose of managing data distributed to plural memory blocks due to the random write operation. In a storage device to which the ZNS standard is applied, a zone reset operation may be frequently performed to process the write request. However, the page-based deallocation operation may make the speed of preparing the free memory block slow, thereby causing an increase in the write latency. As such, the memory block-based deallocation operation may be required or desired.

Figure 10:
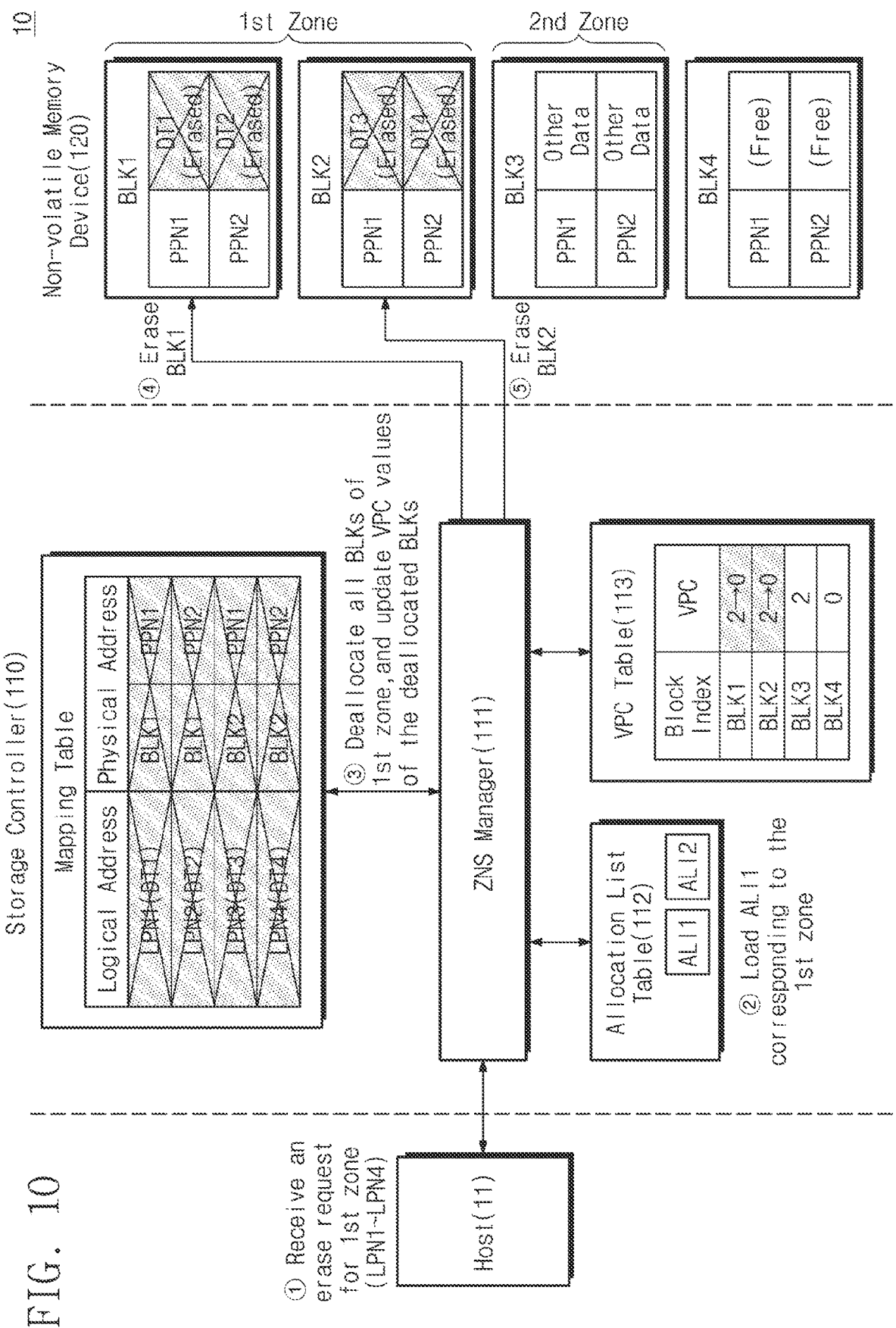
FIG. 10 is a diagram describing a deallocation operation of a storage system according to some example embodiments of the present disclosure.

FIG. 10 is a diagram describing a deallocation operation of a storage system according to some example embodiments of the present disclosure. A memory block-based deallocation operation of the storage system 10 according to some example embodiments of the present disclosure will be described with reference to FIG. 10.

The storage system 10 may include the host 11, the storage controller 110, and the non-volatile memory device 120. The host 11, the storage controller 110, and the non-volatile memory device 120 may respectively correspond to the host 11, the storage controller 110, and the non-volatile memory device 120 of FIG. 6.

Below, the deallocation operation of the storage system 10 will be described.

In a first operation ①, the ZNS manager 111 may receive the erase request for a first zone from the host 11. The erase request for the first zone may indicate erasing the first to fourth data DT1 to DT4 respectively corresponding to the first to fourth logical page numbers LPN1 to LPN4.

In some example embodiments, sequential physical page numbers of all the memory blocks in the first zone may be respectively mapped onto sequential logical page numbers. The sequentially of physical page numbers may be maintained over plural blocks.

For example, after the first memory block BLK1 is allocated to the first zone, the second memory block BLK2 may be allocated to the first zone. The first data DT1 corresponding to the first logical page number LPN1 may be stored at the first physical page of the first memory block BLK1. The second data DT2 corresponding to the second logical page number LPN2 may be stored at the second physical page of the first memory block BLK1. The third data DT3 corresponding to the third logical page number LPN3 may be stored at the first physical page of the second memory block BLK2. The fourth data DT4 corresponding to the fourth logical page number LPN4 may be stored at the second physical page of the second memory block BLK2. It may be regarded as the second physical page of the first memory block BLK1 and the first physical page of the second memory block BLK2 have the physical sequentially.

That is, the first to fourth data DT1 to DT4 may have the logical page numbers LPN1, LPN2, LPN3, and LPN4 logically sequential and the physical page numbers PPN1 (BLK1), PPN2 (BLK1), PPN1 (BLK2), and PPN2 (BLK2) physically sequential.

In some example embodiments, all the memory blocks allocated to the first zone may store only data corresponding to the first zone. For example, before the first operation ①, the storage controller 110 may process the write request to store the first to fourth data DT1 to DT4 corresponding to the first zone in the sequential physical pages of the first memory block BLK1, that is, the first and second physical pages of the first memory block BLK1 and the sequential physical pages of the second memory block BLK2, that is, the first and second physical pages of the second memory block BLK2. The first and second memory blocks BLK1 and BLK2 may not include data corresponding to a zone different from the first zone.

In some example embodiments, the ZNS manager 111 may receive the erase request for resetting a target zone from the host 11. For example, the erase request may indicate the transition to the ZSE state of the ZNS standard and may include the zone management send command for resetting the first zone. The reset operation may refer to a pre-processing operation for a write operation in a ZNS-based storage device incapable of being overwritten. A memory block allocated to a reset-completed zone may store data corresponding to the write request.

In a second operation ②, the ZNS manager 111 may load the first allocation list information ALI1 corresponding to the first zone. The first allocation list information ALI1 may indicate index numbers of all the memory blocks allocated to the first zone. For example, the first allocation list information ALI1 may indicate the first memory block BLK1 and the second memory block BLK2 as all the memory blocks allocated to the first zone. The first allocation list information ALI1 may be used to refer to all the memory blocks allocated to the first zone.

In some example embodiments, the data structure of the allocation list information may have the linked-list format. For example, the data structure of the first allocation list information ALI1 may indicate that the first memory block BLK1 is allocated to the first zone and the second memory block BLK2 is allocated to the first zone after the first memory block BLK1 is allocated.

In a third operation ③, the ZNS manager 111 may deallocate all the memory blocks allocated to the first zone, based on the first allocation list information ALI1 thus loaded. The ZNS manager 111 may update (or set or decrease) VPC values of the deallocated memory blocks.

For example, all the memory blocks allocated to the first zone may be the first memory block BLK1 and the second memory block BLK2. After the ZNS manager 111 simultaneously or contemporaneously removes all mapping information of the first and second memory blocks BLK1 and BLK2 from the mapping table, based on the first allocation list information ALI1 thus loaded, the ZNS manager 111 may decrease the VPC table of the first memory block BLK1 in the VPC table 113 from "2" to "0" and may decrease the VPC table of the second memory block BLK2 in the VPC table 113 from "2" to "0".

That is, as the storage system 10 simultaneously or contemporaneously removes all the mapping information of the target zone corresponding to the erase request instead of removing mapping information by unit of page, the storage system 10 may quickly perform the deallocation operation compared to the conventional storage system SS of FIG. 8. In detail, in the ZNS-based storage device, because the erase request for resetting the target zone is processed under the premise of the logical sequentially and the physical sequentially, the storage system 10 may perform the memory block-based deallocation operation without determining whether physical pages in the memory block are valid.

In a fourth operation ④, the ZNS manager 111 may erase the first memory block BLK1, based on that the VPC value of the first memory block BLK1 is decreased to the target value in the third operation ③. For example, the ZNS manager 111 may provide the physical erase request for the first memory block BLK1 to the non-volatile memory device 120. The non-volatile memory device 120 may erase data present in the first memory block BLK1 depending on the physical erase request.

In a fifth operation ⑤, the ZNS manager 111 may erase the second memory block BLK2, based on that the VPC value of the second memory block BLK2 is decreased to the target value in the third operation ③. For example, the ZNS manager 111 may provide the physical erase request for the second memory block BLK2 to the non-volatile memory device 120. The non-volatile memory device 120 may erase data present in the second memory block BLK2 depending on the physical erase request.

In some example embodiments, the order of the fourth operation ④ and the fifth operation ⑤ may be changed. For example, after the fourth operation ④ is performed, the fifth operation ⑤ may be performed; after the fifth operation ⑤ is performed, the fourth operation ④ may be performed; alternatively, the fourth operation ④ and the fifth operation ⑤ may be performed simultaneously or almost simultaneously or contemporaneously.

In some example embodiments, the storage system 10 may perform reset operations of different zones independently of each other. For example, while the operations described with reference to FIG. 10 are being performed, the ZNS manager 111 may receive the erase request for the second zone from the host 11, may load the second allocation list information ALI2 from the allocation list table 112 based on the erase request for the second zone, may deallocate all the memory blocks allocated to the second zone based on the second allocation list information ALI2, and may provide the physical erase request for all the deallocated memory blocks of the second zone to the non-volatile memory device 120.

In this case, like the first zone, the erase request for the second zone may be processed under the premise of the logical sequentially and the physical sequentially. For example, the erase request for the second zone may indicate deallocating a fifth logical page number and a sixth logical page number that correspond to the second zone and are logically sequential. A memory block allocated to the second zone may include the third memory block BLK3. The fifth logical page number and the sixth logical page number may respectively correspond to the first physical page number PPN1 and the second physical page number PPN2 of the third memory block BLK3.

Figure 11:
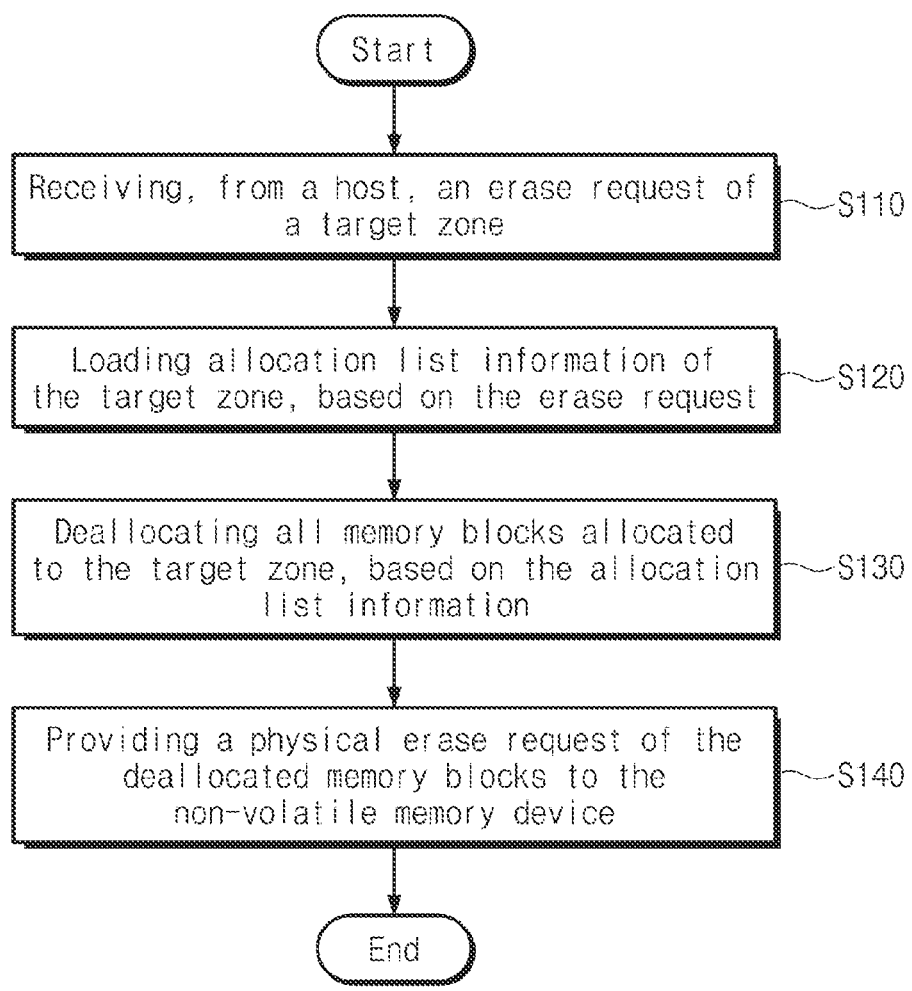
FIG. 11 is a flowchart describing a method of operating a storage controller according to some example embodiments of the present disclosure.

FIG. 11 is a flowchart describing a method of operating a storage controller according to some example embodiments of the present disclosure. Referring to FIG. 11, a storage controller may communicate with a host and a non-volatile memory device. The storage controller may correspond to the storage controller 110 described with reference to FIGS. 1, 2, 6, and 10.

In operation S110, the storage controller may receive the erase request for a target zone of a plurality of zones from the host.

In operation S120, the storage controller may load allocation list information of the target zone from an allocation list table, based on the erase request.

In operation S130, the storage controller may deallocate all the memory blocks allocated to the target zone, based on the allocation list information. In this case, sequential physical page numbers of all the memory blocks in the target zone may be respectively mapped onto sequential logical page numbers.

In operation S140, the storage controller may provide the non-volatile memory device with the physical erase request for all the deallocated memory blocks of the target zone.

In some example embodiments, the storage controller may support the ZNS standard of the NVM express (NVMe).

Figure 12:
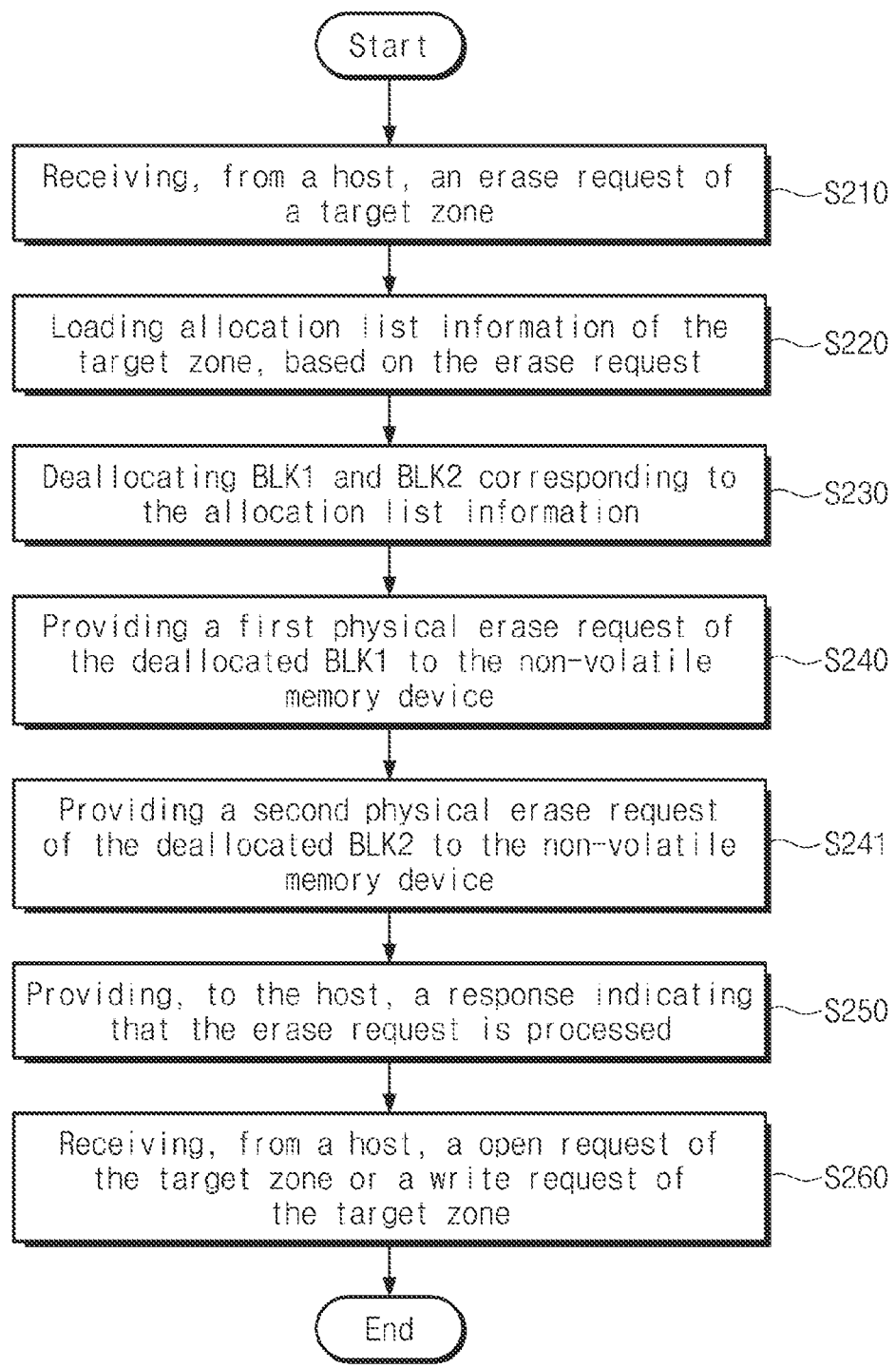
FIG. 12 is a flowchart describing a method of operating a storage controller according to some example embodiments of the present disclosure.

FIG. 12 is a flowchart describing a method of operating a storage controller according to some example embodiments of the present disclosure. Referring to FIG. 12, a storage controller may communicate with a host and a non-volatile memory device. The storage controller may correspond to the storage controller 110 described with reference to FIGS. 1, 2, 6, and 10. Operation S210 and operation S220 are similar to or the same as operation S110 and operation S120 of FIG. 11, and thus, additional description will be omitted to avoid redundancy.

In operation S230, the storage controller may deallocate the first memory block BLK1 and the second memory block BLK2 corresponding to allocation list information. For example, all the memory blocks allocated to the target zone may include the first memory block BLK1 and the second memory block BLK2.

In some example embodiments, operation S230 may include simultaneously or contemporaneously removing mapping information of the first and second memory blocks BLK1 and BLK2 in the mapping table, and setting a VPC value of the first memory block BLK1 and a VPC value of the second memory block BLK2 to a target value in a VPC table, based on that the mapping information is removed.

In operation S240, the storage controller may provide the non-volatile memory device with a first physical erase request for the first memory block BLK1 thus deallocated. After operation S240 is performed, the storage controller may receive a first response indicating that the first physical erase request is processed, from the non-volatile memory device.

In operation S241, the storage controller may provide the non-volatile memory device with a second physical erase request for the second memory block BLK2 thus deallocated. After operation S241 is performed, the storage controller may receive a second response indicating that the second physical erase request is processed, from the non-volatile memory device.

In some example embodiments, the storage controller may perform operation S241 after performing operation S240, may perform operation S240 after performing operation S241, or may perform operation S240 and operation S241 simultaneously or almost simultaneously or contemporaneously.

In operation S250, the storage controller may provide the host with a response indicating that the erase request in operation S210 is processed. For example, the storage controller may receive, from the non-volatile memory device, the first response indicating that the first physical erase request in operation S240 is processed. The storage controller may receive, from the non-volatile memory device, the second response indicating that the second physical erase request in operation S241 is processed. In response to the first response and the second response, the storage controller may provide the host with the response indicating that the erase request in operation S210 is processed.

In operation S260, the storage controller may receive the open request for the target zone or the write request for the target zone from the host. For example, the open request may be used to allow a state of a reset-completed target zone to transition to the ZSIO state to the ZSEO state. The write request may be used to store new data in the reset-completed target zone.

According to some example embodiments of the present disclosure, a storage controller deallocating a memory block, a method of operating the storage controller, and a method of operating a storage device including the storage controller are provided.

Also, the storage controller that deallocates a memory block storing sequential data in units of memory block such that the speed of preparing a free memory block is improved and the write latency decreases, a method of operating the storage controller, and a method of operating a storage device including the storage controller are provided.

Any of the elements and/or functional blocks disclosed above may include or be implemented in processing circuitry such as hardware including logic circuits; a hardware/ software combination such as a processor executing software; or a combination thereof. For example, storage controller 110, and zone management device may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A storage controller comprising:
processing circuitry configured to implement
a zoned namespace (ZNS) manager configured to communicate with a host and a non-volatile memory device,
a mapping table configured to manage a mapping relationship between a logical address and a physical address,
an allocation list table configured to manage allocation list information of a target zone of a plurality of zones of the non-volatile memory device, and
a valid page count (VPC) table configured to manage VPC values of a plurality of memory blocks allocated to the target zone,
wherein the ZNS manager is further configured to
receive an erase request for the target zone from the host,
load the allocation list information of the target zone from the allocation list table based the erase request,
remove a mapping relationship of the plurality of memory blocks allocated to the target zone from the mapping table based on the allocation list information of the target zone, and
provide the non-volatile memory device with a physical erase request for the plurality of memory blocks whose mapping relationship is removed, and
wherein sequential physical page numbers of the plurality of memory blocks of the target zone are respectively mapped onto sequential logical page numbers.

2. The storage controller of claim 1, wherein
the erase request includes a first logical page number and a second logical page number, the first logical page number and the second logical page number correspond to the target zone and are logically sequential,
a first memory block of the plurality of memory blocks allocated to a first zone has a first physical page number and a second physical page number, the first physical page number and the second physical page number being physically sequential, and
the first and second logical page numbers are respectively mapped onto the first and second physical page numbers by the mapping table.

3. The storage controller of claim 1, wherein
the plurality of memory blocks allocated to the target zone by the allocation list information include a first memory block and a second memory block, and
a data structure of the allocation list information of the target zone indicates that the first memory block is allocated to the target zone and the second memory block is allocated to the target zone after the first memory block is allocated.

4. The storage controller of claim 1, wherein the ZNS manager is further configured to:
set VPC values of the plurality of memory blocks in the VPC table to a target value, after the mapping relationship of the plurality of memory blocks allocated to the target zone is removed, and
provide the non-volatile memory device with the physical erase request, after the VPC values are set to the target value.

5. The storage controller of claim 1, wherein the ZNS manager is further configured to:
receive a first response from the non-volatile memory device, the first response indicating that the physical erase request is processed;
provide the host with a second response indicating that the erase request is processed based on the first response; and
after the second response is provided to the host, receive an open request for the target zone or a write request for the target zone.

6. The storage controller of claim 1, wherein the storage controller supports a ZNS standard of a non-volatile memory (NVM) express.

7. A method of operating a storage device, the storage device communicating with a host, the method comprising:
receiving an erase request from the host, the erase request being for a target zone of a plurality of zones of a memory device;
loading allocation list information of the target zone from an allocation list table based on the erase request, the allocation list information identifying memory blocks of the storage device allocated to the target zone;
deallocating all the memory blocks allocated to the target zone simultaneously, based on the allocation list information, wherein sequential physical page numbers of the memory blocks are respectively mapped onto sequential logical page numbers;
physically erasing the deallocated memory blocks of the target zone; and
after the deallocated memory blocks are physically erased, providing the host with a response indicating that the erase request is processed,
wherein the deallocation of all the memory blocks allocated to the target zone comprises simultaneously removing all mapping information of the memory blocks allocated to the target zone from a mapping table based on the allocation list information.

8. The method of claim 7, wherein
the deallocating of all the memory blocks allocated to the target zone based on the allocation list information includes
setting, in a valid page count (VPC) table, VPC values of the memory blocks allocated to the target zone to a target value, after the mapping information is removed, and the physically erasing of the deallocated memory blocks of the target zone includes physically erasing the memory blocks of the target zone, which have the VPC values set to the target value.

9. A method of operating a storage controller, the storage controller communicating with a host and a non-volatile memory device, the method comprising:

receiving a first erase request from the host, the first erase request being for a first zone of a plurality of zones of the non-volatile memory device;

loading first allocation list information of the first zone from an allocation list table based on the first erase request, the first allocation list information identifying memory blocks of the non-volatile memory device allocated to the first zone;

deallocating all the memory blocks allocated to the first zone simultaneously based on the first allocation list information, wherein sequential physical page numbers of the memory blocks are respectively mapped onto sequential logical page numbers; and providing the non-volatile memory device with a physical erase request for the deallocated memory blocks of the first zone, wherein the deallocation of all the memory blocks allocated to the first zone comprises simultaneously removing all mapping information of the memory blocks allocated to the first zone from a mapping table based on the first allocation list information.

10. The method of claim 9, wherein, before the physical erase request is provided, the memory blocks allocated to the first zone store data corresponding to the first zone.

11. The method of claim 9, wherein the first allocation list information indicates index numbers of the memory blocks allocated to the first zone.

12. The method of claim 9, wherein the memory blocks allocated to the first zone include a first memory block and a second memory block, and a data structure of the first allocation list information indicates that the first memory block is allocated to the first zone and the second memory block is allocated to the first zone after the first memory block is allocated.

13. The method of claim 9, wherein the deallocating of all the memory blocks allocated to the first zone based on the first allocation list information includes setting, in a valid page count (VPC) table, VPC values of the memory blocks allocated to the first zone to a target value, after the mapping information is removed, and the providing of the non-volatile memory device with the physical erase request for the deallocated memory blocks of the first zone includes providing the non-volatile memory device with the physical erase request for the memory blocks of the first zone, which have the VPC values set to the target value.

14. The method of claim 9, wherein the first erase request indicates deallocation of a first logical page number, a second logical page number, a third logical page number, and a fourth logical page number, the first logical page number, the second logical page number, the third logical page number, and the fourth logical page number correspond to the first zone and are logically sequential, the memory blocks allocated to the first zone include a first memory block having a first physical page number and a second physical page number, the first physical page number and the second physical page number being physically sequential; and a second memory block having a third physical page number and a fourth physical page number, the third physical page number and the fourth physical page number being physically sequential, and wherein the first to fourth logical page numbers are respectively mapped onto the first to fourth physical page numbers.

15. The method of claim 14, further comprising:

receiving a second erase request for a second zone of the plurality of zones from the host;

loading second allocation list information of the second zone from the allocation list table based on the second erase request, the second allocation list information identifying memory blocks of the non-volatile memory device allocated to the second zone;

deallocating all the memory blocks allocated to the second zone simultaneously based on the second allocation list information; and providing the non-volatile memory device with a physical erase request for the deallocated memory blocks of the second zone.

16. The method of claim 15, wherein the second erase request indicates deallocation of a fifth logical page number and a sixth logical page number, the fifth logical page number and the sixth logical page number correspond to the second zone and are logically sequential, wherein the memory blocks allocated to the second zone include a third memory block having a fifth physical page number and a sixth physical page number, the fifth physical page number and the sixth physical page number being physically sequential, and the fifth and sixth logical page numbers are respectively mapped onto the fifth and sixth physical page numbers.

17. The method of claim 9, further comprising:

receiving a first response indicating that the physical erase request is processed, from the non-volatile memory device; and providing the host with a second response indicating that the first erase request is processed, based on the first response.

18. The method of claim 17, further comprising:

after the second response is provided to the host, receiving an open request for the first zone or a write request for the first zone from the host.

19. The method of claim 9, wherein the storage controller supports a zoned namespace (ZNS) standard of a non-volatile memory (NVM) express.

20. The method of claim 19, wherein the first erase request indicates a transition of the first zone to a zones space empty (ZSE) state of the ZNS standard and includes a zone management send command for resetting the first zone.

* * * * *